US009614790B2

(12) United States Patent
Takahashi et al.

(10) Patent No.: US 9,614,790 B2
(45) Date of Patent: Apr. 4, 2017

(54) APPARATUS FOR CONTROLLING EXECUTION OF SOFTWARE, METHOD FOR CONTROLLING THEREOF, AND COMPUTER-READABLE RECORDING MEDIUM HAVING COMPUTER PROGRAM FOR CONTROLLING THEREOF

(71) Applicant: CASIO COMPUTER CO., LTD., Tokyo (JP)

(72) Inventors: Hiroshi Takahashi, Tachikawa (JP); Yuji Sonoyama, Fussa (JP); Koji Nishitani, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 406 days.

(21) Appl. No.: 13/944,517

(22) Filed: Jul. 17, 2013

(65) Prior Publication Data
US 2014/0032685 A1    Jan. 30, 2014

(30) Foreign Application Priority Data

Jul. 25, 2012   (JP) .................. 2012-164510

(51) Int. Cl.
H04L 12/58         (2006.01)
G06F 3/048         (2013.01)
(Continued)

(52) U.S. Cl.
CPC ............ H04L 51/00 (2013.01); G06Q 10/06 (2013.01); G06Q 10/10 (2013.01); G06Q 50/12 (2013.01)

(58) Field of Classification Search
CPC ..... H04L 51/00; H04L 63/0853; H04L 63/12; H04L 67/2814; H04L 29/12783;
(Continued)

(56) References Cited

U.S. PATENT DOCUMENTS 5,311,425 A    5/1994  Inada
5,748,974 A    5/1998  Johnson
(Continued)

FOREIGN PATENT DOCUMENTS

CN    100548007 C     10/2009
GB      2342194 A  *   4/2000
(Continued)

OTHER PUBLICATIONS

Korean Office Action dated Dec. 30, 2013 (and English translation thereof) in counterpart Korean Application No. 10-2012-0086415.
(Continued)

Primary Examiner — Kamal Divecha
Assistant Examiner — Clifton Houston
(74) Attorney, Agent, or Firm — Holtz, Holtz & Volek PC

(57) ABSTRACT

A software execution control apparatus includes a reference information management unit for collecting and renewing reference information to be referred to for execution of a plurality of applications, a user message preprocessing unit for receiving a user message, extracting one or more components from the user message, and analyzing the user message based on the extracted components, a message processing unit for specifying one or more actions required by the user based on the analysis result of the user message, and an APP execution unit for selecting and executing one or more applications based on reference information managed by the reference information management unit.

16 Claims, 15 Drawing Sheets

(51) Int. Cl.
*G06F 15/16* (2006.01)
*G06Q 10/06* (2012.01)
*G06Q 10/10* (2012.01)
*G06Q 50/12* (2012.01)

(58) Field of Classification Search
CPC ......... H04L 61/35; H04L 63/18; H04L 12/58; H04L 29/12066; H04L 61/1511; H04L 12/5895; G06Q 10/06; G06Q 10/10; G06Q 50/12; G06Q 20/20; G06F 17/2705; H04M 1/72552
See application file for complete search history.

(56) References Cited

U.S. PATENT DOCUMENTS

| | | | |
|---|---|---|---|
| 6,397,191 B1* | 5/2002 | Notani | G06F 9/46 705/7.26 |
| 6,901,417 B2 | 5/2005 | Anglin et al. | |
| 7,448,046 B2 | 11/2008 | Navani et al. | |
| 7,657,870 B2 | 2/2010 | Berg et al. | |
| 8,615,546 B2 | 12/2013 | Nielsen et al. | |
| 2002/0196279 A1 | 12/2002 | Bloomfield et al. | |
| 2003/0135384 A1 | 7/2003 | Nguyen | |
| 2004/0044636 A1* | 3/2004 | Casati | G06Q 10/06 |
| 2005/0015775 A1* | 1/2005 | Russell | G06F 9/4428 719/315 |
| 2005/0066309 A1* | 3/2005 | Creamer | G06Q 30/018 717/127 |
| 2005/0070251 A1* | 3/2005 | Satake | H04L 12/1859 455/411 |
| 2006/0212510 A1* | 9/2006 | Nielsen | G06F 17/2705 709/203 |
| 2007/0011261 A1* | 1/2007 | Madams | H04L 12/58 709/207 |
| 2007/0116013 A1* | 5/2007 | Brown | G06Q 10/06 370/395.53 |
| 2007/0123206 A1 | 5/2007 | Satake et al. | |
| 2007/0192152 A1 | 8/2007 | Frank | |
| 2008/0032667 A1 | 2/2008 | Yamane | |
| 2008/0126986 A1 | 5/2008 | Tsukiji | |
| 2008/0201453 A1 | 8/2008 | Assenmacher | |
| 2009/0054041 A1 | 2/2009 | Satake et al. | |
| 2010/0005152 A1* | 1/2010 | Ramamurthy | G06Q 10/10 709/217 |
| 2010/0281462 A1 | 11/2010 | Festa | |
| 2011/0202864 A1* | 8/2011 | Hirsch | G06F 3/0482 715/773 |
| 2011/0265188 A1 | 10/2011 | Ramaswamy et al. | |
| 2012/0304307 A1 | 11/2012 | Ramesh et al. | |
| 2012/0311157 A1* | 12/2012 | Erickson | G06F 9/541 709/226 |
| 2013/0346992 A1* | 12/2013 | Sonoyama | G06F 9/46 718/102 |
| 2014/0173340 A1* | 6/2014 | Gutjahr | G06Q 10/06 714/15 |

FOREIGN PATENT DOCUMENTS

| | | |
|---|---|---|
| JP | 09231145 A | 9/1997 |
| JP | 2005107998 A | 4/2005 |
| JP | 2009-516306 A | 4/2009 |
| WO | WO 91/08540 A1 | 6/1991 |
| WO | 0011571 A1 | 3/2000 |
| WO | 2004071013 A1 | 8/2004 |
| WO | WO 2007/059183 A2 | 5/2007 |

OTHER PUBLICATIONS

Extended European Search Report dated May 20, 2014 in counterpart European Application No. 13176780.8.
Japanese Office Action (and English translation thereof) dated Aug. 4, 2015, issued in counterpart Japanese Application No. 2012-164510.
Related U.S. Appl. No. 13/916,504; First Named Inventor: Yuji Sonoyama; Title: "Computing System, Method for Controlling Thereof, and Computer-Readable Recording Medium Having Computer Program for Controlling Thereof"; filed Jun. 12, 2013.
Bae, et al., "Automatic Control of Workflow Processes Using ECA Rules", IEEE Transactions on Knowledge and Data Engineering, vol. 16, No. 8, Aug. 2004, pp. 1010-1023, subsection 2.1, "Workflow Process Model", at p. 1011.
Chinese Office Action (and English translation thereof) dated Aug. 8, 2016, issued in counterpart Chinese Application No. 201310315054.2.

* cited by examiner

Fig. 4

| User | User Message | Component | | | |
|---|---|---|---|---|---|
| | | ENTi1 | ENTi2 | ENTi3 | COMMi1 |
| User1 | User Message i | ENTj1 | ENTj2 | COMMj1 | COMMj2 |
| User2 | User Message j | ... | ... | ... | ... |
| ... | ... | | | | |

[Embodiment of Structured User Message]

Fig. 5

| Entity | kind | Type |
|---|---|---|
| ENT01 | Kind01 | str |
| ENT02 | Kind02 | int |
| ENT03 | Kind03 | date |
| ENT04 | Kind04 | int |
| ... | ... | ... |

[Embodiment of Entity Structure Table]

Fig. 6

| Command | Number |
|---|---|
| COMM01 | No01 |
| COMM02 | No02 |
| COMM03 | No03 |
| ... | ... |

[Embodiment of Command Structure Table]

Fig. 7

| Stereotyped Message | Command Part | | | | Entity Part | | | Action Flow | |
|---|---|---|---|---|---|---|---|---|---|
| | | | | | Kind01 | Kind02 | Kind03 | | |
| StpMES01 | COMM11 | | | | Type11:ENT11 | Type12:ENT12 | | ACT11 | ACT12 |
| StpMES02 | COMM21 | | | | Type21:ENT21 | Type22:ENT22 | Type23:ENT23 | ACT13 | ACT14 |
| StpMES03 | COMM31 | COMM32 | | | Type31:ENT31 | Type32:ENT32 | Type33:ENT33 | ACT13 | ACT15 |
| StpMES04 | COMM41 | COMM42 | COMM43 | | Type41:ENT41 | Type42:ENT42 | Type43:ENT43 | ACT41 | ACT42 |
| ... | ... | | | | ... | ... | ... | ... | ... |

[Stereotyped Message DB]

Note: Action Flow additional column values — ACT16 appears for StpMES01, StpMES02, StpMES03.

| Stereotyped Message | Command Part | Entity Part | | | | Action Flow | | |
|---|---|---|---|---|---|---|---|---|
| | | Date | Time (hour) | No. of persons | Object | | | Mobile phone message |
| New Reservation | Reservation | Date:20\*\*/\*\*/\*\* | int:\* | int:\* | | Inquiry of table | New reservation registration | |
| Sales Inquiry | Inquiry | Date:20\*\*/\*\*/\*\* | | | Sales | Inquiry of sales information | Create report ← 510 | |

[Embodiment of stereotyped message DB for restaurant]

Fig. 9

[Action Request Synonym Database]

| Action Request | Action Request Synonym | | | |
|---|---|---|---|---|
| REQ01 | SYN11 | SYN12 | SYN13 | SYN14 |
| REQ02 | SYN21 | SYN22 | SYN23 | SYN24 |
| REQ03 | SYN31 | SYN32 | SYN33 | SYN34 |
| REQ04 | SYN41 | SYN42 | SYN43 | SYN44 |
| ... | ... | ... | ... | ... |

[Corresponding Job Database]

| Action Request | Corresponding Job | | | |
|---|---|---|---|---|
| REQ01 | JOB11 | JOB12 | JOB13 | JOB14 |
| REQ02 | JOB21 | JOB22 | JOB23 | JOB24 |
| REQ03 | JOB31 | JOB32 | JOB33 | JOB34 |
| REQ04 | JOB41 | JOB42 | JOB43 | JOB44 |
| ... | ... | ... | ... | ... |

[Corresponding Job-Action Database]

| Corresponding Job | Action | | | |
|---|---|---|---|---|
| JOB11 | ACT111 | ACT112 | ACT113 | ACT114 |
| JOB12 | ACT121 | ACT122 | ACT123 | ACT124 |
| JOB21 | ACT211 | ACT212 | ACT213 | ACT214 |
| JOB22 | ACT221 | ACT222 | ACT223 | ACT224 |
| JOB31 | ACT311 | ACT312 | ACT313 | ACT314 |
| ... | ... | ... | ... | ... |

| Component | COMMj1 | | | COMMj2 | | |
|---|---|---|---|---|---|---|
| Action Request Synonym | SYN11 | | SYN21 | SYN31 | | |
| Action Request | REQ01 | | REQ02 | REQ03 | | |
| Corresponding Job | JOB11 | | JOB21 | JOB31 | | |
| Action | ACT111 | ACT112 | ACT211 | ACT212 | ACT311 | ACT312 | ACT313 |

[List of Candidate actions of Each Component]

Fig. 13

| User | Characteristic | Weight of Choice | | | | | | |
|---|---|---|---|---|---|---|---|---|
| User1 | REQ01 | JOB11 | W11 | JOB12 | W12 | JOB13 | W13 | ⋮ |
| | REQ02 | JOB21 | W21 | JOB22 | W22 | JOB23 | W23 | ⋮ |
| | REQ03 | JOB31 | W31 | JOB32 | W32 | JOB33 | W33 | ⋮ |
| | JOB11 | ACT111 | W111 | ACT112 | W112 | ACT113 | W113 | ⋮ |
| | JOB21 | ACT211 | w211 | ACT212 | W212 | ACT213 | W213 | ⋮ |
| | JOB31 | ACT311 | W311 | ACT312 | W312 | ACT313 | W313 | ⋮ |
| | ACT111 | APP1111 | W1111 | APP1112 | W1112 | APP1113 | W1113 | ⋮ |
| | ACT311 | APP3111 | W3111 | APP3112 | W3112 | APP3113 | W3113 | ⋮ |
| | ⋮ | ⋮ | ⋮ | ⋮ | ⋮ | ⋮ | ⋮ | ⋮ |
| User2 | REQ01 | JOB11 | W13 | JOB12 | W12 | JOB13 | W11 | ⋮ |
| | REQ02 | JOB21 | W22 | JOB22 | W21 | JOB23 | W23 | ⋮ |
| | REQ03 | JOB31 | W33 | JOB32 | W31 | JOB33 | W32 | ⋮ |
| | ⋮ | ⋮ | ⋮ | ⋮ | ⋮ | ⋮ | ⋮ | ⋮ |
| User3 | REQ01 | JOB11 | W12 | JOB12 | W11 | JOB13 | W13 | ⋮ |
| | REQ02 | JOB21 | W23 | JOB22 | W22 | JOB23 | W21 | ⋮ |
| | ⋮ | ⋮ | ⋮ | ⋮ | ⋮ | ⋮ | ⋮ | ⋮ |

[List of Candidate Action Flows]

| No | Candidate Action Flow of User Message j | Product of Weights |
|---|---|---|
| 1 | ACT111-ACT311 | P1 |
| 2 | ACT111-ACT312 | P3 |
| 3 | ACT111-ACT313 | P4 |
| 4 | ACT211-ACT311 | P2 |
| 5 | ACT211-ACT312 | P6 |
| 6 | ACT211-ACT313 | P7 |
| 7 | ACT112-ACT311 | P5 |
| ... | | |

Fig. 15

| Action | Corresponding Application | | |
|---|---|---|---|
| ACT11 | APP111 | APP112 | APP113 |
| ACT12 | APP121 | APP122 | APP123 |
| ACT13 | APP131 | APP132 | APP133 |
| ACT14 | APP141 | APP142 | APP143 |
| ACT21 | APP211 | APP212 | APP213 |
| ACT22 | APP221 | APP222 | APP223 |
| ACT23 | APP231 | APP232 | APP233 |
| ACT24 | APP241 | APP242 | |
| ⋮ | ⋮ | ⋮ | ⋮ |

| Application | Procedure |
|---|---|
| APP211 | authentication |
|  | input Name |
|  | Phone_no search |
|  | output Phone_no |
| APP212 | authentication |
|  | input in01 |
|  | input in02 |
|  | command01 |
|  | output out01 |
|  | output out02 |
| APP213 | authentication |
|  | input in01 |
|  | command01 |
|  | input in02 |
|  | command02 |
|  | output out01 |
|  | output out02 |
| APP311 | input in01 |
|  | input in02 |
|  | command01 |
|  | output out01 |
| APP312 | input in01 |
|  | input in02 |
|  | command01 |
|  | output out01 |
| .... | .... |

570

APPARATUS FOR CONTROLLING EXECUTION OF SOFTWARE, METHOD FOR CONTROLLING THEREOF, AND COMPUTER-READABLE RECORDING MEDIUM HAVING COMPUTER PROGRAM FOR CONTROLLING THEREOF

CROSS-REFERENCE TO RELATED APPLICATIONS

This application is based upon and claims the benefit of priority under 35 USC 119 of Japanese Patent Application No. 2012-164510 filed on Jul. 25, 2012, the entire disclosure of which, including the description, claims, drawings, and abstract, is incorporated herein by reference in its entirety.

BACKGROUND OF THE INVENTION

1. Field of the Invention

The present invention relates to an apparatus for controlling execution of a software, a method for controlling thereof, and a computer-readable recording medium having a computer program for controlling thereof. Particularly, the present invention relates to an apparatus for controlling execution of a software which is capable of flexibly dealing with an operation required by a user by executing a software stored in a user's computer system or a software stored in an external computer system, e.g., a server, a method for controlling thereof, and a computer-readable recording medium having a computer program for controlling thereof.

2. Description of the Related Art

There are various scales and types of restaurants including a small personal business, a franchise and the like. In order to manage such various restaurants, various types of tasks need to be performed. Conventionally, such tasks have been processed by a person directly or by using a commercial application depending on types of tasks. For example, a store owner can obtain sales information by purchasing an accounting software in the market, installing the software in a personal computer, inputting selling information in the software, and executing the software. Recently, various restaurant business applications are being actively developed along with the development and spread of a high performance computing system, such as a personal computer, a smart phone, a tablet PC or the like, in which an application software (hereinafter, referred to as "application" or simply referred to as "APP") can be installed or a web service can be used by accessing a web server (see, e.g., WO 91/08540 A1. 1991.6.13.)

A restaurant owner or an employee performs a required task by inputting data of a predetermined specific type and format in a dedicated application for a specific task and then executing the application. Occasionally, a store owner or an employee himself may develop an application by generating a program code in order to perform a desired task. However, it is more usual to have a special developer develop a dedicated application, or to purchase and use a commercial application that has been developed by a special developer. When a desired task includes an operation that is not supported by a single application, one or more applications capable of executing such operation are searched and additionally executed. Or, a store owner or an employee himself performs such operation.

In a restaurant business, various types of tasks, e.g., reservation management, account book making, inventory management and the like, need to be performed. Further, it is often that such various tasks need to be linked together. However, it is considerably difficult in terms of cost and time for store owners to develop dedicated applications suitable for their own requests and circumstances in order to process the above-described various tasks. Moreover, even if the applications are developed by the store owners, program codes of the applications need to be changed or completely new applications need to be developed in order to deal with changes in details or processes of the tasks whenever the changes occur.

In case of purchasing and using a commercial application developed by a special developer, it is not possible to add a function that is not provided by the corresponding application or change a function or an operation of the application. Therefore, when a new function is needed, it is required to additionally purchase a separate application or develop a dedicated application having a desired function. Moreover, a single application may not support all of various functions required for tasks to be performed. In order to realize an additional function that is not supported by a single application, a separate application that supports the additional function needs to be executed. Further, there exists the inconvenience of repetitively inputting the same data into a plurality of applications or changing formats of input data one by one. Moreover, considerable time is required in searching an application for supporting the desired function. When a desired application cannot be searched, a target task itself may not be carried out. Furthermore, there is a problem that an unscheduled task cannot be performed at all by an application developed for a specific operation.

SUMMARY OF THE INVENTION

The object of the present invention is to solve the above-described problems of the prior art. Specifically, an object of the present invention is to provide an apparatus for controlling execution of a software which can control execution of a plurality of softwares to quickly and conveniently process various types of tasks required for a restaurant business, a method for controlling thereof, and a computer-readable recording medium having a computer program for controlling thereof. It should be understood that the application field of the present invention is not limited to a restaurant and the present invention may be applied to any field to which the technical idea of the present invention can be applied, such as a hospital, a school, a bookstore, a theater, a shopping mall, a theme park or the like. According to a first aspect of the present invention, there is provided a software execution control apparatus for controlling execution of a plurality of applications based on a user message received from a user, including: a reference information management unit for collecting and renewing reference information to be referred to for execution of a plurality of applications; a user message preprocessing unit for receiving a user message input by or transmitted from a user by a predetermined method, extracting one or more components from the received user message, and analyzing said user message based on the extracted components; a message processing unit for specifying one or more actions required by the user based on said analysis result of said user message; and an APP execution unit for selecting application to be executed to perform each of the specified one or more actions based on reference information managed by the reference information management unit and the one or more actions specified by the message processing unit, and executing the selected application.

According to a second aspect of the present invention, there is provided a software execution control method for controlling execution of a plurality of applications based on a user message received from a user by using a software execution control apparatus, including: a reference information management step of collecting and renewing reference information to be referred to for execution of a plurality of applications; a user message preprocessing step of receiving a user message input by or transmitted from a user by a predetermined method, extracting one or more components from the received user message, and analyzing the user message based on the extracted components; a message processing step of specifying one or more actions required by the user based on said analysis result of the user message; and an APP execution step of selecting applications to be executed to perform each of the specified one or more actions based on the reference information and the one or more actions specified in said message processing step, and executing the selected application.

According to a third aspect of the present invention, there is provided a recording medium for recording a program for controlling a computer to execute a plurality of applications based on a user message received from a user, wherein the computer functions as: a reference information management unit for collecting and renewing reference information to be referred to for execution of a plurality of applications; a user message preprocessing unit for receiving a user message input by or transmitted from a user by a predetermined method, extracting one or more components from the received user message, and analyzing the user message based on the extracted components; a message processing unit for specifying one or more actions required by the user based on the analysis result of the user message; and an APP execution unit for selecting applications to be executed to perform each of the specified one or more actions based on reference information managed by the reference information management unit and the one or more actions specified by the message processing unit, and executing the selected application.

According to the present invention, it is possible to provide a software execution control apparatus, a software execution control method and a computer-readable recording medium for recording a program for controlling a computer to execute a plurality of applications which quickly and effectively deal with various tasks required by a user by creating an action flow that satisfies tasks required by a user, selecting one or a plurality of applications in accordance with the action flow, and controlling execution of the selected applications. Accordingly, it is possible to deal with various tasks required by a user by combining a plurality of applications in various manners without additional development of dedicated applications for performing various operations of a complicated task.

BRIEF DESCRIPTION OF THE DRAWINGS

The present invention will more sufficiently be understood by the following detailed description and the accompanying drawings, which are, however, exclusively for explanation and do not limit the scope of the present invention.

Here:

FIG. 4 shows a structured user message in accordance with an embodiment of the present invention;

FIG. 5 shows an entity structure table of the structured user message in accordance with the embodiment of the present invention;

FIG. 6 shows a command structure table of the structured user message in accordance with the embodiment of the present invention;

FIG. 7 shows a structure of a stereotyped message database in accordance with an embodiment of the present invention;

FIG. 8 shows an embodiment of a system for restaurant of the stereotyped message database shown in FIG. 7;

FIG. 9 shows a structure of an action request synonym database in accordance with an embodiment of the present invention;

FIG. 10 shows a structure of a corresponding job database in accordance with an embodiment of the present invention;

FIG. 11 shows a structure of a corresponding job-action database in accordance with an embodiment of the present invention;

FIG. 12 shows a list of candidate actions of each of components of a user message in accordance with an embodiment of the present invention;

FIG. 13 shows a structure of a characteristic information database in accordance with an embodiment of the present invention;

FIG. 14 shows a list of candidate action flows of a user message in accordance with an embodiment of the present invention;

FIG. 15 shows a structure of an action-APP database in accordance with an embodiment of the present invention;

FIG. 17 shows a structure of an APP procedure database in accordance with an embodiment of the present invention;

DETAILED DESCRIPTION OF THE PREFERRED EMBODIMENT

Hereinafter, embodiments of the present invention will be described in detail with reference to the accompanying drawings. The technical scope of the present invention is not limited to the embodiments illustrated in the accompanying drawings.

Figure 1:
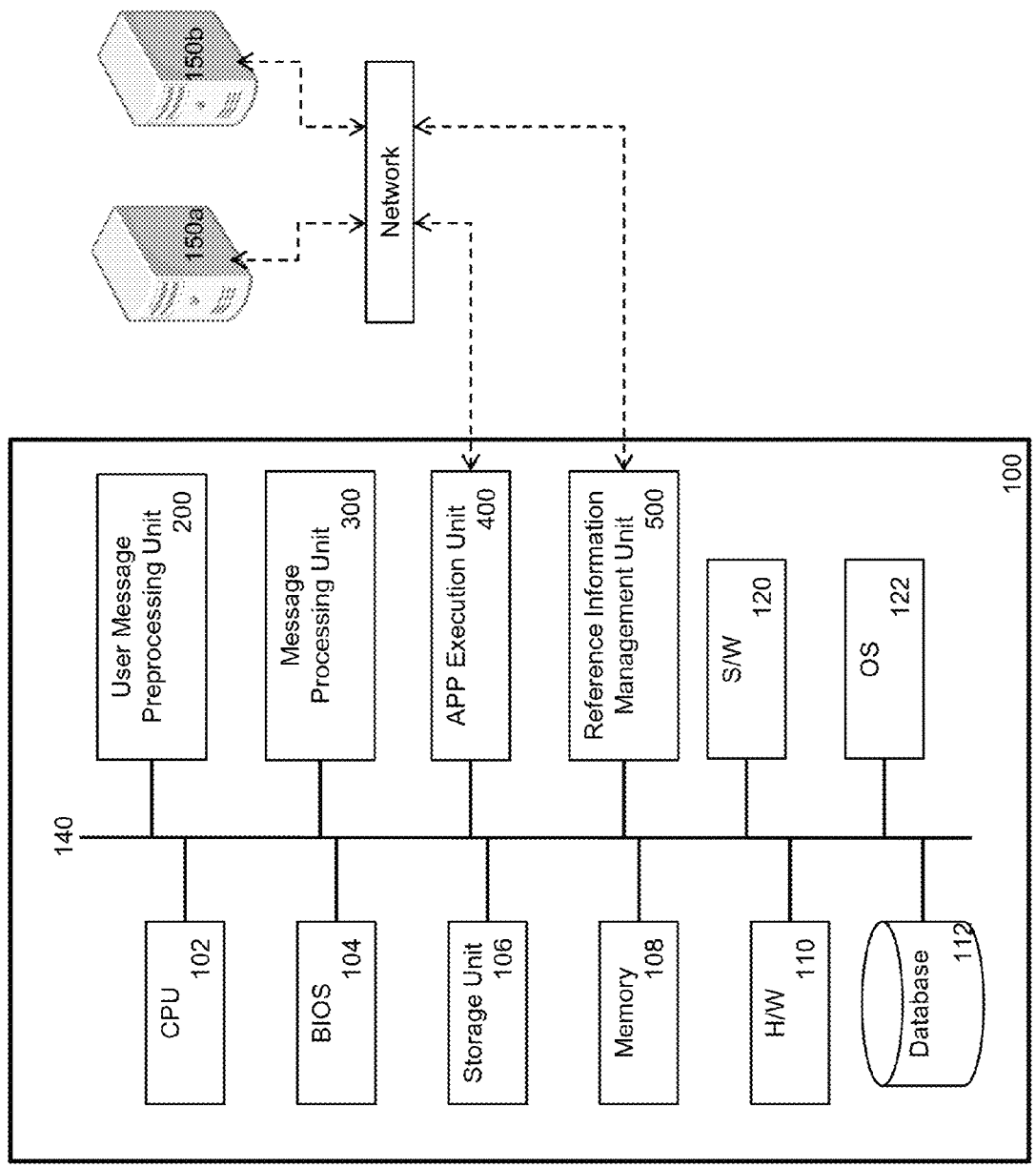
FIG. 1 is a conceptual diagram showing a configuration of an apparatus for controlling execution of a software in accordance with an embodiment of the present invention.

FIG. 1 is a conceptual diagram showing a configuration of an apparatus for controlling execution of a software 100 in accordance with an embodiment of the present invention. As shown in FIG. 1, in accordance with an embodiment of the present invention, the apparatus for controlling execution of a software 100 of the present invention includes: a central processing unit (CPU) 102; a basic input output system (BIOS) 104; a storage unit 106 such as a hard disk, a CD-ROM or the like for storing data, file or the like; a memory 108; various hardwares 110 such as a USB, a power supply, a display device and the like; and a database 112 for managing various data or information in correlation with each other. Further, the apparatus for controlling execution of a software 100 of the present invention includes: a software 120 such as a programming interface (API), various drivers, a library or the like; and an operating system (OS) 122. Moreover, the apparatus for controlling execution of a software 100 of the present invention further includes: a user message preprocessing unit 200 for structuring and analyzing a user message received from a user; a message processing unit 300 for creating an action flow for understanding a user's request from the user message and specifying a task or an operation for specifying the user's request; an APP execution unit 400 for selecting an application corresponding to the action flow and controlling execution of the selected application; and a reference information management unit 500 for collecting and renewing reference information to be referred to for execution of a plurality of applications. The above-described components are connected to one another by a bus 140. FIG. 1 shows only an embodiment of configurations of the apparatus for controlling execution of a software 100 of the present invention. In other embodiments, a part of the above components may not be included, or other components may be further included.

The apparatus for controlling execution of a software 100 includes a typical computer system such as a main frame, a mini computer, a workstation, a personal computer or the like, and a handheld device such as a tablet computer, a PDA, a smart phone or the like having computing capabilities. The hardware type or the software architecture such as a structure, an operation system or the like of the apparatus for controlling execution of a software 100 is not particularly limited. For example, the apparatus for controlling execution of a software 100 may be a POS (Point of Sale) terminal device. Each of the components 200 to 500 may be implemented in a software that can be recorded in a proper hardware such as a ROM, a flash memory, a hard disk, a CD-ROM, a DVD or the like, or may be implemented as a hardware/software combination such as a logic circuit or the like. Further, all of the components 200 to 500 may be implemented in a single device, or may be implemented by being distributed over a plurality of devices. For example, a part of or all the components 200 to 500 may be stored in an external server connected via a network.

When the components 200 to 500 are implemented in softwares, they may be implemented by object-oriented programming using languages such as Objective-C, C++, Java and the like. Moreover, they may be implemented by procedural programming using languages such as BASIC, C and the like. Although FIG. 1 shows an embodiment in which the components 200 to 500 are implemented separately from the hardware such as the CPU 102 or the like or from the OS 122, they may be implemented as a part of the OS 122 in accordance with the designer's selection, or may be implemented as applications. In other words, those skilled in the art to which the present invention pertains can easily understand that the technical idea of the present invention may be implemented in any type. The detailed configurations and operations of the components 200 to 500 will be described in detail through this specification and especially in the following description.

Various applications for business may be stored in the storage unit 106 or the memory 108 of the apparatus for controlling execution of a software 100, or may be stored in separate computer systems 150a and 150b such as an external server (e.g., a web server.) In this specification, the term "application (or an abbreviation thereof "APP")" may refer to an individual application software and a part of a software that performs an independent function. The application may be implemented in the form of an application that is installed in a user terminal device and independently executed and also in various types such as servlet, applet, widget, web service and the like. In other words, the applications may be implemented in any type. Each of the applications generates an output of a unique format independently or through interworking with other applications. When the applications are stored in the apparatus for controlling execution of a software 100, they may be called based on location information specified as a specific folder of a specific directory. When the applications are stored in the external computer system 150a or 150b, they may be called or searched based on location information, e.g., URL (Uniform Resource Locator) or the like.

The user message preprocessing unit 200 identifies a type of a user message and structures the user message to extract one or more user message components therefrom. Next, the user message preprocessing unit 200 analyzes the structured message and determines whether the user message is a stereotyped message or a non-stereotyped message. Each of the components of the user message is a word indicating independent information, and may be classified in accordance with contents into a command for specifying a specific action or operation and an entity that is a semantic content (person, thing, matter, place, time or the like) utilized for execution of a command. The stereotyped message contains commands of the predetermined number and contents and entities of the predetermined number and types. When the user message is a stereotyped message, the message processing unit 300 reads out an action flow corresponding to the stereotyped message by referring to database in which the stereotyped messages and the action flows are recorded in correspondence with each other. When the user message is not a stereotyped message, the message processing unit 300 understands the request of the user message and creates combination of a series of or parallel tasks or operations for satisfying the understood request, i.e., an action flow. The action flow specifies timing or order of actions to be executed, i.e., execution timing. The APP execution unit 400 selects applications corresponding to the actions included in the action flow created by the message processing unit and then executes the selected applications. Further, the APP execution unit 400 generates a control signal for converting a type and/or a format of data to be input to the applications or controlling execution of the applications. The APP execution unit may generate an output to be provided to the user or a recipient determined based the user message by selectively combining output data of the executed applications. The reference information management unit 500 constructs and manages various reference information referred to by the message processing unit 300 and the APP execution unit 400. The reference information management unit 500 can renew various reference information by receiving related information from a system designer, a system manager, a user or the like, or by collecting and classifying the information regularly or in real time.

Figure 2:
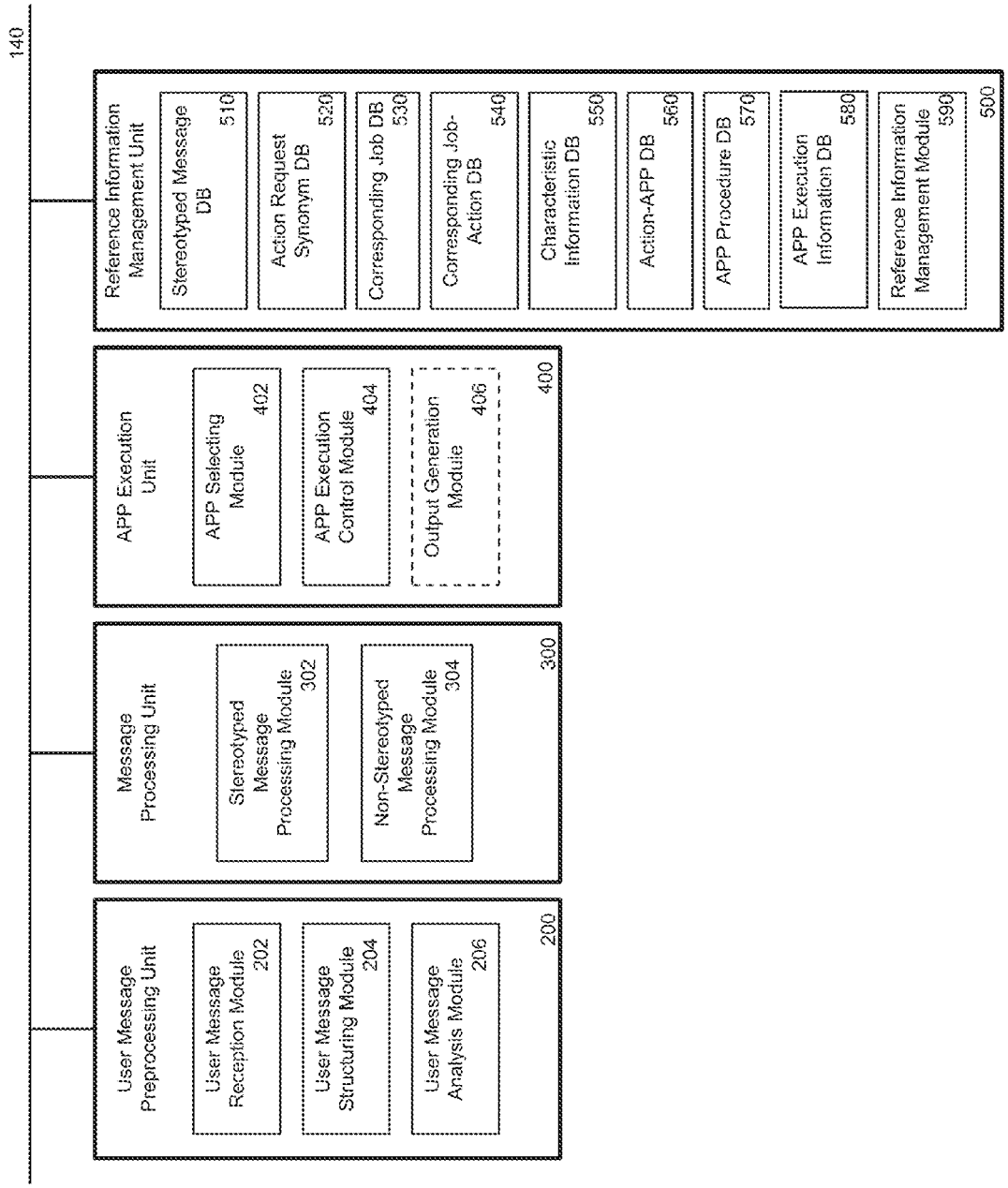
FIG. 2 is a conceptual diagram showing an embodiment of configurations of a user message preprocessing unit, a message processing unit, an APP execution unit, and a reference information management unit of the apparatus for controlling execution of a software of the present invention.

FIG. 2 shows an embodiment of configurations of the message preprocessing unit 200, the message processing unit 300, the APP execution unit 400, and the reference information management unit 500 of the apparatus for controlling execution of a software of the present invention. In the embodiment shown in FIG. 2, each of the message preprocessing unit 200, the message processing unit 300, the APP execution unit 400, and the reference information management unit 500 is implemented so as to include a plurality of modules for executing the above-described operations. Those skilled in the art to which the present invention pertains can easily understand that there may be various implementation methods different from that shown in FIG. 2 and the technical scope of the present invention is not limited by the scope of the functional structure of the modules.

The user message preprocessing unit 200 includes a user message reception module 202, a user message structuring module 204, and a user message analysis module 206. When a user inputs a user message that orders execution of a predetermined task to the apparatus for controlling execution of a software 100, the apparatus for controlling execution of a software 100 initiates an operation. When the user inputs or transmits the user message by a predetermined method, the user message is received by the user message reception module 202. The user message can be input through an input device (not shown) such as a keyboard, a mouse, a microphone or the like, which is wirely or wirelessly connected to the apparatus for controlling execution of a software 100. If the apparatus for controlling execution of a software 100 includes a display device, a graphic user interface may be provided through the display device such that the user can input the user message through the input device such as a mouse or the like. In that case, an icon for instructing a specific task which is displayed on the display device may be clicked. If a voice command is input through a microphone, the user message reception module 202 converts the voice command into text and transfers the text to the user message structuring module 204. Further, the apparatus for controlling execution of a software 100 may receive a user's request in the format of an email, a text message or the like from an external communication device. To do so, the apparatus for controlling execution of a software 100 may be provided with unique identification information such as pre-designated email address, telephone number or the like. For example, a user may transmit an email to a mail address pre-designated in the apparatus for controlling execution of a software 100 by using a mobile phone different from the apparatus for controlling execution of a software 100 in order to request execution of a specific task to the apparatus for controlling execution of a software 100. In that case, the user can request a task required for the apparatus for controlling execution of a software 100 even at a location remote from the apparatus for controlling execution of a software 100, which is extremely convenient.

For convenience, the user message may be created in a natural language that is usually used by a user. The user only needs to describe a task in a natural language without specifically knowing an application to be executed to perform a specific task, type or format of input of one or a plurality of applications to be executed, or the like. For example, it is assumed that the apparatus for controlling execution of a software 100 is a POS terminal device installed in a restaurant and a user is a store owner who manages the restaurant. When the user located outside the restaurant for personal purposes needs to know sales on that day, the user only needs to transmit an email or a text message of "inform me of today's sales" to the POS terminal device by using the user's mobile phone. In that case, as will be described later, the POS terminal device identifies a required application by processing the user message and then executes the identified application. Next, the sales data on that day which has been obtained as a result of the execution is created in a proper format (e.g., a text file) and transmitted to the mobile phone of the user in the format of an email or a text message. By diversifying the method capable of inputting a user message as described above, the convenience can be considerably improved.

The user message structuring module 204 extracts a meaningful data (e.g., identity of a transmitter, a transmission data, a transmission location or the like) and a text contained in the user message received by the user message reception module 202. Then, the user message is decomposed into morphemes as minimum units having meanings by applying, e.g., morpheme analysis, to the user message (especially, text contents other than format information.) The morpheme analysis method varies in accordance with characteristics of languages, and various types of analysis techniques exist for various languages. A morpheme analysis method to be employed is determined by the system designer's selection, and it is not necessary to employ a specific method. Next, the user message structuring module 204 structures a user message by assigning semantic markers to the morphemes of the user message. In order to designate the semantic markers to the morphemes, there is used, e.g., an ontology mapping technique. For example, "five o'clock" has a semantic marker of time, and "oo company" has a semantic marker of enterprise. Further, the user message structuring module 204 specifies overall meaning of the user message by structuring the user message in accordance with, e.g., 5W1H.

For example, when the user transmits a message in the format of an email, the user message structuring module 204 can identify the email address of the transmitter, the text of the message or the like from the email received by the user message reception module 202, and determine a user from the identified email address and whether or not the user has authority to access the apparatus for controlling execution of a software 100. To do so, it is preferable to construct in advance a user database in which identification information such as an ID, an email address, a mobile phone number or the like of each of users is recorded. If a user who does not have authority to access the apparatus for controlling execution of a software 100, the operation is completed. In that case, the apparatus for controlling execution of a software 100 may transmit a message that is a notification of such intention to a person selected among a transmitter, a system manager, or a user having authority. Meanwhile, if the user has legitimate authority, the user's request is more precisely understood by performing the above-described message analysis.

Next, the user message structuring module 204 extracts one or more user message components (hereinafter, simply referred to as "components"), i.e., an entity and a command, from the structured user message. For example, when the user message is structured based on 5H1W, components corresponding to 5W are entities, and a component corresponding to 1H is a command. Conventionally, the user message may contain one or more components that are commands. An embodiment of the structured user message is illustrated in FIG. 4. In the embodiment of FIG. 4, a user message i of a user 1 contains entities ENTi1, ENTi2 and ENTi3, and a command COMMi1, for example. The components that are entities may be used as an input data required to execute applications later.

Then, the user message analysis module 206 analyzes the structured user message in order to determine whether the user message is a stereotyped message or a non-stereotyped message. To do so, an entity structure table and a command structure table for the structured user message may be created. The entity structure table identifies and stores kinds and types of each of entities, and the command structure table identifies contents of the commands and stores the number of the commands. Accordingly, it is possible to determine types of the entities and contents of the command which are contained in the user message. More detailed description on the analysis of the user message will be provided later with reference to FIGS. 4 to 6. If the user message contains entities of the predetermined types and commands of the predetermined number and contents, this message is determined to be a stereotyped message. To do so, the structure of the stereotyped message (kinds and types of entities, contents and the number of commands) are recorded in a stereotyped message database 510 to be described later, and the structure of the currently input user message is compared with that of the stereotyped message stored in the database. As a consequence, it is possible to determine whether the user message is a stereotyped message or a non-stereotyped message. Particularly, in case of a task that is likely to be repetitively requested among various tasks that can be requested by a user, it is preferable to store in advance the stereotyped structure of the user message which corresponds to the corresponding task in the stereotyped message database 510.

Next, the message processing unit 300 includes: a stereotyped message processing module 302 for performing processes such as creation of an action flow for a user message determined to be a stereotyped message by the user message analysis module 206 and a user message determined to be a non-stereotyped message by the user message analysis module 206, or the like; and a non-stereotyped message processing module 304. In this specification, as a task to be executed to satisfy a user' request, a minimum unit task or operation that can be independently distinguished in terms of contents is referred to as "action." The task requested by the user through the specific message may include a single action. However, it may include two or more actions combined in a predetermined order. The sequential or parallel combination of one or more actions of the task is referred to as "action flow." The action flow designates execution timing (timing or order of execution) of actions to be executed. On the assumption that the apparatus for controlling execution of a software 100 of the present invention is used in a restaurant, "reservation information registration," "reservation information inquiry," "reservation information deletion," "reservation information change" or the like correspond to the actions. Each of these actions may be implemented by a single application or a part of a single application. In accordance with the present invention, the action is defined as a minimum unit task or operation that can be distinguished in terms of contents, so that the same action may be repetitively executed for a single user message. For example, the action of "reservation information inquiry" may be executed only once to retrieve reservation information of a single customer on a specific date in a specific store. However, it may be repetitively executed multiple times to retrieve reservation information of all of customers on a specific date in all of stores.

As will be described later with reference to FIGS. 7 and 8, the stereotyped message database 510 records one or more stereotyped messages in correspondence with a predetermined action flow. By utilizing the stereotyped message database 510, when there exists a user message analyzed as a stereotyped message during execution, the stereotyped message processing module 302 can read out the action flow corresponding to the stereotyped message from the stereotyped message database 510. If a single user message contains two or more stereotyped messages, a final action flow for the corresponding user message can be created by combining action flows corresponding to each of the stereotyped messages sequentially or in parallel. Accordingly, when a stereotyped message is input as the user message, the action flow required to process the corresponding message can be quickly and easily created simply by reading out the information recorded in the stereotyped message database 510.

Meanwhile, the non-stereotyped message processing module 304 creates an action flow for processing the non-stereotyped user message by selecting actions corresponding to the components of the user message that has not been analyzed as a stereotyped message, i.e., the user message that has been analyzed as a non-stereotyped message, and combining the selected actions sequentially or in parallel. An action request synonym database 520, a corresponding job database 530, a corresponding job-action database 540 and/or a characteristic information database 550 which will be described later are referred to for selection of the actions. The operation of the non-stereotyped message processing module 304 will be described later with reference to FIGS. 9 to 14.

Next, the APP execution unit 400 includes an APP selecting module 402 and an APP execution control module 404. An output generation module 406 may be selectively included in accordance with embodiments. The APP selecting module 402 selects applications corresponding to the actions of the action flow created by the message processing unit 300. The APP execution control module 404 executes a part of or all the selected applications. The APP selecting module 402 can select an application corresponding to each of the actions by referring to an action-APP database 560 to be described later. The action-APP database 560 records identification information of actions that are independently executed unit tasks or operations and identification information of applications required to perform the corresponding actions in correspondence with each other. As a result of referring to the action-APP database 560, if a plurality of applications for performing a single action exists, a more appropriate application is selected by referring to the characteristic information database 550 to be described later. In order to execute the selected application, the APP execution control module 404 generates a control signal required to execute the application by referring to an APP procedure database 570 to be described later. Further, the APP execution control module 404 converts a type of a format of database required to execute the application, when necessary, by referring to an APP execution information database 580.

After the execution of all of the selected applications is completed, the processing result is transmitted to the user or a recipient determined based on the user message. The processing result may be an output data of a finally executed application or a part of or all of the output data of all of the executed applications. This depends on the request contents of the user message. When necessary, the output data provided to the user or the specific recipient may be converted in accordance with a predetermined type, format or output type. Or, the output generation module 406 may generate a processing result by combining a part of or all of the output data of all of the executed applications and provide the processing result in a predetermined type, format or output type to the user or the specific recipient. The output generation module 406 may divide a part of or all of the output data into a plurality of outputs, or may combine a plurality of output data into a single or a different number of outputs. The type, format or output type of the output data which is suitable for the user or the specific recipient may be determined by referring to the characteristic information database 550.

The reference information management unit 500 includes the stereotyped message database 510, the action request synonym database 520, the corresponding job database 530, the corresponding job-action database 540, the characteristic information database 550, the action-APP database 560, the APP procedure database 570, the APP execution information database 580, and the reference information management module 590. The structures of the databases 510 to 580 are shown in FIGS. 7, 9, 10, 11, 13, 15, 17 and 18, respectively. Detailed description of the databases will be provided later with reference to the corresponding drawings. In accordance with the present embodiment, all of the databases 510 to 580 are constructed inside the reference information management unit 500 of the apparatus for controlling execution of a software 100 of the present invention. However, those who skilled in the art to which the present invention pertains can clearly understand that it is not necessary to construct a part of or all of the databases 510 to 580 inside the apparatus for controlling execution of a software 100 and it is possible to utilize database that has been constructed beforehand in, e.g., an external server or the like.

The reference information management module 590 constructs and renews the databases 510 to 580 regularly or irregularly. The databases 510 to 580 may be constructed in advance before the user's request is processed, or may be constructed in real time during the processing. The information recorded in the databases 510 to 580 may be changed, added or deleted by the system designer, the system manager or the user having legitimate authority. To do so, the reference information management module 590 may provide an appropriate interface. Furthermore, since the information recorded in the database may change over time, the reference information management module 590 renews the database regularly or irregularly so that the changed information can be included in the database. As a result, the user's request can be dealt with more appropriately.

For example, the reference information management module 590 collects information on the applications by searching a predetermined area inside or outside the apparatus for controlling execution of a software 100 regularly or irregularly or when an instruction from the system manager or the user is received. Based on the collected information, the reference information management module 590 registers identification information of the applications in the action-APP database 560 or the characteristic database 550, or manages the changes thereof. The reference information management module 590 detects changes such as whether there exists a new application, whether the location information of the conventional application has been changed, whether the application has been updated, whether the application has been deleted, or the like. The reference information management module 590 renews the information recorded in the corresponding database by referring to the changes. For example, if the application that has been stored in the apparatus for controlling execution of a software 100 is moved to another folder, the reference information management module 590 detects the movement and renews the location information of the corresponding application which has been recorded in the action-APP database 560 with the changed location information. At this time, if the same information is recorded in a plurality of databases, it is preferable to renew the plurality of databases at one time. Further, when an update version of the application exists, the application information of the action-APP database 560 is renewed with the location information of the update version.

Figure 3:
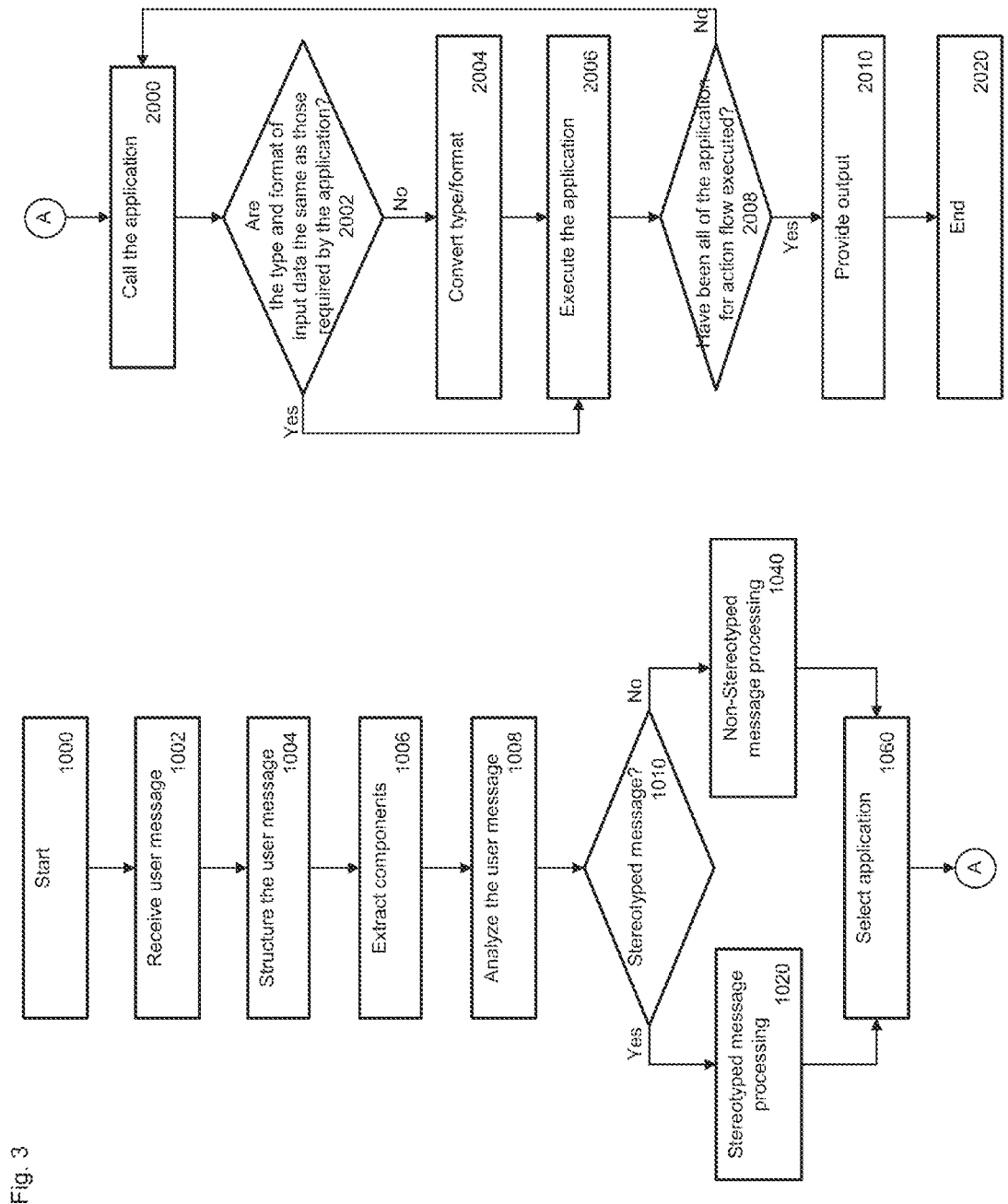
FIG. 3 is a flowchart showing a method for controlling execution of a software in accordance with an embodiment of the present invention.

Hereinafter, a method for controlling execution of a software in accordance with an embodiment of the present invention will be described with reference to FIG. 3. The processes of the present invention are initiated by inputting or transmitting a user message that requests to a user the execution of a predetermined task to the apparatus for controlling execution of a software 100 of the present invention (step 1000.) The apparatus for controlling execution of a software 100 receives the user message input or transmitted by a predetermined method (step 1002) and then structures the user message (step 1004.) For example, when the user message is created in the format of a natural language, the morpheme analysis method is applied to the received user message, and the semantic marker is assigned to each morpheme. Next, the apparatus for controlling execution of a software 100 extracts one or more components, i.e., an entity and/or an command, from the structured user message (step 1006.) Then, the apparatus for controlling execution of a software 100 identifies the number and contents of the extracted commands and the kinds and types of the entities in order to analysis the structured user message (step 1008.) Next, whether or not the user message is a stereotyped message is determined based on the identified information (step 1010.) To do so, the stereotyped message database 510 is referred to.

When the user message is a stereotyped message (step 1010: Yes), an action flow corresponding to the user message is created by reading out the action flow that has been recorded in the stereotyped message database 510 in correspondence with the corresponding stereotyped message (step 1020.) When the user message is a non-stereotyped message (step 1010: No), an action flow is created by selecting action requests corresponding to the extracted components to understand the user's request contained in the user message, selecting actions for satisfying the selected action requests, and combining the selected actions sequentially or in parallel (step 1040.) The created action flow can be stored in a cache memory, a buffer, a queue or the like. When the action flow is created from the user message, applications for executing the actions of the action flow are selected (step 1060.) To do so, the action-APP database 560 in which the actions are recorded in correspondence with the applications for satisfying the corresponding actions can be referred to. In addition, when there exists a plurality of applications corresponding to a single action, the most appropriate application can be selected among the plurality of applications by referring to, e.g., the characteristics information database 550.

Next, the apparatus for controlling execution of a software 100 calls the selected applications (step 2000.) The applications may be called based on the location information thereof. Then, types and formats of input data required by the corresponding applications are checked for each of the applications (step 2002.) To do so, it is possible to refer to the APP execution information database 580 in which the identification information of the applications is recorded in correspondence with the types and formats of the input data of the corresponding applications. If the type and format of the data to be input to the application are the same as those of the corresponding application (step 2002: Yes), the application is executed by inputting the data to the application (step 2006.) If the type and format of the data to be input are different from those of the corresponding application (step 2002: No), the type or the format of the data is converted in accordance with the type or the format of the input data (step 2004.) Next, the apparatus for controlling execution of a software 100 checks whether or not the applications for all the actions of the action flow have been executed (step 2008.) When a part of the applications to be executed has not been executed (step 2008: No,) the process returns to step 2000. When the execution of all the applications corresponding to the action flow has been completed (step 2008: Yes,) the output data of a part of or all of the applications is provided to the user or the specific recipient selected based on the user message (step 2010) and, then, the processing for the corresponding user message is completed (step 2020.)

Hereinafter, the analysis of the user message will be described in detail with reference to FIGS. 4 to 6. FIG. 4 shows a structured user message in accordance with an embodiment of the present invention. FIG. 5 shows an entity structure table of the structured user message in accordance with the embodiment of the present invention. FIG. 6 shows a command structure table of the structured user message in accordance with the embodiment of the present invention. As shown in FIG. 4, a user message i received from a user 1 contains three entities ENTi1, ENTi2 and ENTi3, and a single command COMMi1, and a user message j received from a user 2 contains two entities ENTj1 and ENTj2, and two commands COMMj1 and COMMj2. The user message analysis module 206 creates an entity structure table and a command structure table from the structured user message. As shown in FIG. 5, the entity structure table stores data types and kinds of each of entities contained in the user message. For example, the kinds of the entities may be determined based on the semantic markers assigned by the user message structuring module 204, and may include title, telephone number, date, the number of persons or the like. The command structure table identifies and stores contents of commands the number of commands. Based on the entity structure table and the command structure table, it is possible to determine types of entities and contents of commands which are contained in the user message. Those skilled in that art to which the present invention pertains can understand that the above-described user message analysis method is only an embodiment and various modifications and alternatives exist. For example, the above embodiment has described the case in which the stereotyped message contains both of entity and command. However, in another embodiment, a stereotyped message containing only entity may exist. In still another embodiment, a stereotyped message containing only command may exist. The structure of the stereotyped message is merely a design choice, and the present invention is not limited to a specific configuration.

Next, the stereotyped message database 510 will be described with reference to FIGS. 7 and 8. The stereotyped message database 510 records identification information of stereotyped messages (StpMES01, StpMES02, StpMES03, StpMES04, . . . ), structures of each of the stereotyped messages, and an action flow that satisfies each of the stereotyped messages in correspondence with one another. For example, the stereotyped message StpMES01 has a structure containing a single command COMM11, and two entities ENT11 and ENT12. The kind and type of the entity ENT11 are Kind01 and Type11, respectively. The kind and type of the entity ENT12 are Kind02 and Type12, respectively. If the received user message has the above-described structure (i.e., containing the command COMM11, and the entities ENT11 and ENT12 of the above kind and type), the corresponding user message corresponds to the stereotyped message StpMES01. Accordingly, the action flow for the user message may be designated as ACT11+ACT12+ ACT16. When the user message is analyzed as a stereotyped message, it can be quickly dealt with by reading out the action flow recorded in correspondence with the corresponding stereotyped message from the stereotyped message database 510.

Those skilled in the art to which the present invention pertains can clearly understand that the stereotyped message database shown in FIG. 7 is only an embodiment and various modifications or alternatives exist. It should be understood that the stereotyped message database 510 can be constructed for each of users or companies, or consistently for all the users. A preferable type and content may be changed in accordance with categories of businesses or contents of works, and can be selected by the system designer by considering user's convenience, system efficiency, or the like. In another embodiment, a plurality of actions flows corresponding to a single stereotyped message may exist. In such embodiment, the user can select the most appropriate action flow among the plurality of action flows by referring to the characteristic information recorded in the characteristic information database 550 to be described later.

FIG. 8 shows a stereotyped message database 510' in accordance with an embodiment of a system for restaurant. For example, reservation is one of the tasks that are usually and frequently required in a restaurant. The information necessary for reservation is restricted to reservation date, reservation time, and the number of persons, so that the request for this task can be stereotyped. As illustrated, the stereotyped message of "new reservation" has a structure containing a command of "reservation" and entities of date, time and the number of persons. For example, when the user message i shown in FIG. 4 is "reservation for three persons at 6 o'clock on 2012/07/01," the user message analysis module 206 analyzes that the user message contains a command of "reservation" and entities of date "2012/07/01", time "6 o'clock", and the number of persons "3 persons," and compares this with the structure of the stereotyped message recorded in the stereotyped message database 510. Therefore, the user message i can be determined to be a stereotyped message of "new reservation." Accordingly, the action flow for the user message can be easily created by reading out the action flow recorded in correspondence with the stereotyped message, i.e., [inquiry of table (whether or not an empty table capable of accommodating the corresponding number of persons exists on date and time of reservation)+new reservation registration (recording of reservation information)+text message (notification of reservation completion to a predetermined recipient,)] from the stereotyped message database 510'. The above-described three entities are used as input data of the application to be executed for execution of the action flow. In that case, even when the user message is "reservation for three persons at 6 o'clock today," the term "today" may be analyzed as the date of, e.g., "2012/07/01." Therefore, the user message may be processed as the above stereotyped message.

Hereinafter, the processing of the non-stereotyped message in accordance with an embodiment of the present invention will be described with reference to FIGS. 9 to 13. FIGS. 9 to 11 show the action request synonym database 520, the corresponding job database 530, and the corresponding job-action database 540 in accordance with an embodiment of the present invention, respectively. FIG. 12 shows an embodiment of a list of candidate actions of each of components which is generated for a non-stereotyped message. FIG. 13 shows an embodiment of the characteristic information database 550.

The action request synonym database 520 records one or more synonyms in correspondence with one or more action requests of a task whose execution is requested by the user message. In this specification, instructions or words that are frequently used by users to indicate a task or an operation executed by a predetermined application or a part thereof are referred to as action requests. The synonyms of the action requests are words of the same meanings or similar meanings those of the action requests and actually frequently used or likely to be used by users in the related industry. Next, the corresponding job database 530 records one or more corresponding jobs to be executed to satisfy the user's request contained in the user message in correspondence with each of the action requests. Further, the corresponding job-action database 540 records one or more actions required to perform each of the corresponding jobs in correspondence with each of the corresponding jobs. Here, the action requests REQ01, REQ02, REQ03, REQ04, . . . and the action request synonyms SYN11, SYN12, . . . of the action request synonym database 520 are selected by a system designer, a system manager, a user or the like, and may be input beforehand or in real time during the processing of the non-stereotyped message. This is also applied to the corresponding job database 530 and the corresponding job-action database 540.

Hereinafter, the process for generating a list of candidate actions of each of the components shown in FIG. 12 for the user message j (see FIG. 4) that is a non-stereotyped message will be described. As illustrated, in accordance with this embodiment, the user message j contains two entities and two commands. It is assumed that ENTj1 and ENTj2 among the components are entities having clearly specified meanings. In that case, it is not necessary to specify the action requests for the components ENTj1 and ENTj2. If objects specified by the entities are not clear, the action requests can be specified to clearly define the entities. For example, when the user message of "reservation for five persons at 6 PM today" is input to a system for restaurant, "today," "6 PM," and "five persons" among the components correspond to entities, and "reservation" corresponds to a command. If the meaning of "today" among the above entities is not clear, it is possible to refer to the action request synonym database 520 in order to clearly specify the date of "today." For example, the action request of "data inquiry" may be specified for the entity. Meanwhile, when the user message contains a pronoun such as "it" or "he" and thus it is not possible to specify the entity, discourse analysis may be used. In case of the command of "reservation", the action request corresponding thereto is specified by referring to the action request synonym database 520.

In order to specify the action requests for two commands COMMj1 and COMMj2 of the user message j, the non-stereotyped message processing module 304 refers to the action request synonym database 520. As a result of the reference, it is determined that the command COMMj1 corresponds to the synonyms SYN11 and SYN21. Therefore, the action requests REQ01 and REQ02 are made to correspond to the command COMMj1. Since the command COMMj2 corresponds to the synonym SYN31, the action request REQ03 corresponds to the action request. By referring to the action request synonym database 520 as described above, the action requests can be specified for the components of the user. Meanwhile, it is not necessary to use the action request synonym database 502 in order to specify the action requests. Further, as described above, the action requests or the synonyms thereof may be input in real time. In that case, the non-stereotyped message processing module 304 provides an interface to the user, the system manager or the like so that the user, the system manager or the like can determine action requests. Or, the non-stereotyped message processing module 304 can understand action requests corresponding to the components of the user request through Internet search or the like. Or, the non-stereotyped message processing module 304 can allow a user to select action requests or transmit a query message for additional explanation.

Next, the non-stereotyped message processing module 304 refers to the corresponding job database 530 in order to select corresponding jobs corresponding to each of the action requests specified for the components. In an embodiment of FIG. 10, there exists a plurality of corresponding jobs corresponding to each of REQ01, REQ02 and REQ03. Among them, a more appropriate corresponding job may be selected by referring to the characteristic information database 550 or may be selected directly by a system manager, a user or the like. In the present embodiment, the corresponding jobs JOB11 and JOB21 are selected for the component COMMj1, and the corresponding job JOB31 is selected for the component COMMj2. Meanwhile, in the present embodiment, a single corresponding job is selected for a single action request. However, it is also possible to select a plurality of corresponding jobs.

Then, the non-stereotyped message processing module 304 selects the most appropriate action for each of the selected corresponding jobs by referring to the corresponding job-action database 540. The most appropriate action may be selected by referring to the characteristic information database 550 or directly by a system manager, a user or the like. In the embodiment of FIG. 12, among the actions recorded in correspondence with each of the corresponding jobs JOB11 and JOB21 selected for the component COMMj1, ACT111, ACT112, ACT211, and ACT212 are selected as more appropriate actions. ACT311, ACT312 and ACT313 are selected for the component COMMj2. In this manner, the list of candidate actions of each of the components shown in FIG. 12 can be created for the user message j.

The action request synonym database 520, the corresponding job database 530, the corresponding job-action database 540 and/or the characteristic information database 550 may be generated, added and deleted in advance or in real time by a system designer, a system manager, a user or the like. Further, all of the databases are not necessarily included in the apparatus for controlling execution of a software 100 of the present invention. Besides, at least a part of the databases may be replaced with real-time specification, input or the like by a system designer, a system manager, a user or the like.

In the above embodiment, two databases 530 and 540 are used to understand actions from the action request. However, in another embodiment, it is possible to use a single database, i.e., an action request-action database. In other words, by recording the action requests and the actions in direct correspondence with each other, the number of processes required to specify the actions for the action request can be reduced. In the present embodiment as well, the action request-action database can be generated, added and deleted in advance or in real time by a system designer, a system manager, a user or the like. The databases are not necessarily included in the apparatus for controlling execution of a software 100 of the present invention, and may be replaced with real-time specification, input or the like by a user, a system designer, a system manager or the like.

In an embodiment in which two databases, i.e., the corresponding job database 530 and the corresponding job-action database 540, are used to specify the action, the processing is increased compared to that in an embodiment in which only a single database is used, so that the processing time may be further increased. However, the case of using two databases is advantageous in that the possibility of selecting an action more appropriate for a user's request is increased.

If actions corresponding to components cannot be specified, the following operations are carried out in accordance with embodiments: i) it is determined that the user message cannot be processed, and the operation of the apparatus for controlling execution of a software 100 is completed; ii) history information on past application execution for the processing of the same message or a similar message by a corresponding user or a different user is referred to; or iii) information collected by web search or the like is utilized. In that case, the processing type may be selected by a system designer or the like in consideration of user's convenience, system efficiency or the like.

Hereinafter, the characteristic information database 550 will be described in detail with reference to FIG. 13. As illustrated, the characteristic information database 550 records information on various characteristics of each of users in correspondence with weight of each of choices related to the characteristics. In some embodiments, only the priority of choices may be stored instead of storing weight of each of the choices. The weight or the priority for a plurality of choices may be determined by i) a user, a system manager, a system designer or the like; by ii) reference to the history information on the processing of non-stereotyped messages in the past; or by iii) properties of the choices. In case of selecting the choices of each of the characteristics, it is possible to select choices of highest weight or highest priority or to select the most appropriate combination among combinations of choices of each of the characteristics. For example, in the former case, a single corresponding job of highest weight is selected for an action request specified for each of the components of the non-stereotyped message, and a single action of highest weight is selected for the selected corresponding action. In the latter case, there can be employed an embodiment in which a plurality of actions selected in descending order of weight among the actions corresponding to each of the corresponding actions selected for each of the components is selected and the most appropriate action or a plurality of appropriate actions among combination of the selected actions is selected. Other combinations can also be used. Particularly, one or more combinations can be selected in descending order of sum or product of weights of choices contained in each of the combinations.

When the weight or the priority is determined in accordance with the properties of the choices, the weight or the priority of applications corresponding to a single action may be determined by, e.g., the following methods.

TABLE 1

| Property | Content |
| --- | --- |
| Cost | Priority is higher as the cost of the application is lower. |
| Security and authentication | The application stored inside the apparatus for controlling execution of a software 100 has higher priority compared to the application stored in an external device. |

TABLE 1-continued

| Property | Content |
| --- | --- |
| Efficiency | Or, the application requiring authentication has higher priority. Priority is higher as the size of application (memory occupation area) is smaller. |
| Degree of recognition | Application used by a larger number of users has higher priority. |

The properties described in the [Table 1] are merely examples. In order to determine the priority of the applications, a part of or all the properties may be used together with other properties or completely different properties may be used. Preferably, the reference information management module 590 collects information on changes of the information recorded in the characteristic information database 550 regularly or irregularly and renews the characteristic information database 550 based thereon.

Hereinafter, the process for understanding actions from the non-stereotyped message will be described by using a simulated case in a restaurant field. For example, it is assumed that the user message notifying "Staff meeting is postponed from 11 AM to 12 AM" has been input. The user message preprocessing unit 200 receives the user message and structures the received message. The components of the user message that has been structured by the user message preprocessing unit 200 are classified into three entities "11 AM", "staff meeting," and "12 AM" and a single command "postpone." In order to understand the action corresponding to the command component "postpone," the non-stereotyped message processing module 304 selects the most appropriate action for the command "postpone" by referring to the action request synonym database 520, the corresponding job database 530 and the corresponding job-action database 540. The action requests, the corresponding jobs and the actions which have been selected for the command are shown in the following [Table 2].

TABLE 2

| Component | Action request | corresponding job | Action |
| --- | --- | --- | --- |
| Postpone | Delay | Time change | Schedule change |
| | Contact | Contact to participants | Email Text message |

In other words, referring to the example of the [table 2], three actions "schedule change," "contact by email," and "contact by text message" can be selected for the command "postpone." The three actions thus selected can be executed sequentially or in parallel. In accordance with another embodiment of the present invention, only a single action can be understood for the user message by selecting the action of highest weight among the selected actions by referring to the characteristic information database 550. Or, two actions can be selected by selecting actions of high priority for each of the corresponding jobs. For example, an action flow of (schedule chamber+email) or (schedule change+text message) may be created for the component "postpone."

Hereinafter, a method for creating an action flow of a non-stereotyped message will be described with reference to FIG. 14. The non-stereotyped message processing module 304 creates an action flow that is combination of actions corresponding to each of the components in the list of candidate actions of each of the components shown in FIG. 12. By combining a plurality of actions specified for COMMj1 and a plurality of actions specified for COMMj2, a list of a plurality of action flow candidates is generated as shown in FIG. 14. In the present embodiment, twelve action flow candidates exist. In the embodiment of FIG. 14, in order to select a more appropriate action flow among them, weights of the actions of the action flow are multiplied and two action flows P1 and P2 are selected in descending order of the products of weights. In another embodiment, a single action flow including an action of highest weight or priority is selected. In still another embodiment, action flows may be selected by selecting actions for each of the two corresponding jobs specified for the component COMMj1 and combining the selected two actions with the actions selected for COMMj2 (e.g., ACT111+ACT211+ACT311.) The action flows thus created are stored in cache memory, buffer, queue or the like for each of users or in the order of generation. The action flows are processed in the order of storage or in the order of urgency. The action flows may also be processed in other orders.

Hereinafter, the action-APP database 560 in accordance with an embodiment of the present invention which is shown in FIG. 15 will be described. The action-APP database 560 records identification information of actions in correspondence with identification information of applications required to execute the actions. The identification information of the applications includes location information such as information on folders where the applications are stored, URL, or the like. The APP selecting module 402 determines applications for each of the actions of the action flow by referring to the action-APP database 560. When a plurality of applications corresponds to a single action, the applications may be selected by referring to the characteristic information database 550 or may be selected by a system designer, a system manager, a user or the like. The reference information management module 590 adds, changes or deletes the actions recorded in the action-APP database 560. For example, when a new action that has not been expected during the system design is required, the new action is added to the action-APP database 560. To do so, an interface can be provided so that a system designer, a system manager, an application developer, or a user having legitimate authority can directly input the new action and the application identification information for identifying an application required to execute the new action. When the new action is added, the reference information management module 590 searches the application required to execute the new action and records the searched application identification information in the action-APP database 560.

Figure 16:
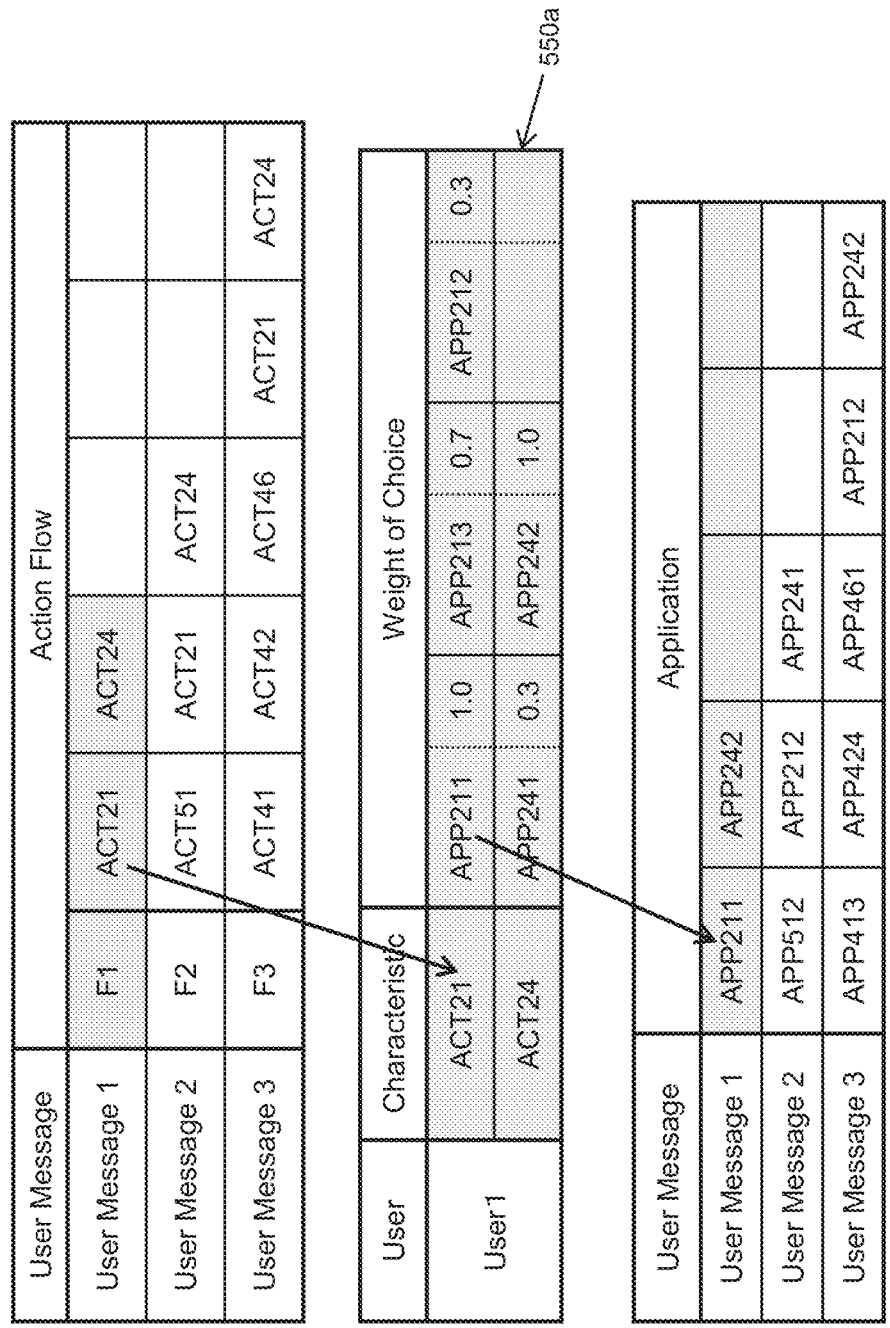
FIG. 16 is a conceptual diagram of an application specifying method in accordance with an embodiment of the present invention.

A method for specifying applications required to execute the actions of the action flow will be described with reference to FIG. 16. In an embodiment of FIG. 16, an action flow F1 of a user 1 includes actions ACT21 and ACT24. The APP selecting module 402 refers to the action-APP database 560 in order to determine an application corresponding to ACT21. Since there exists a plurality of applications corresponding to ACT21, an application APP211 of highest priority among the applications APP211, APP212, and APP213 corresponding to the action ACT21 is selected from a characteristic information database 550a of a user 1. In the same manner, an application APP211 is selected for the action ACT24. In accordance with another embodiment of the present invention, the APP selecting module 402 can search and determine applications required for each of the actions from the storage unit 106 inside the apparatus for controlling execution of a software 100, the external server (150a and 150b of FIG. 1), or the like. The purpose of this is to deal with the case where the information on an application corresponding to a specific action does not exist in the action-APP database 560, the case where the information on the application exists in the action-APP database 560 but the validity thereof is not clear, or the like. When a new application required to perform a specific action has been searched, it is preferable for the reference information management module 590 to add the identification information of the new application to the action-APP database 560.

Figure 18:
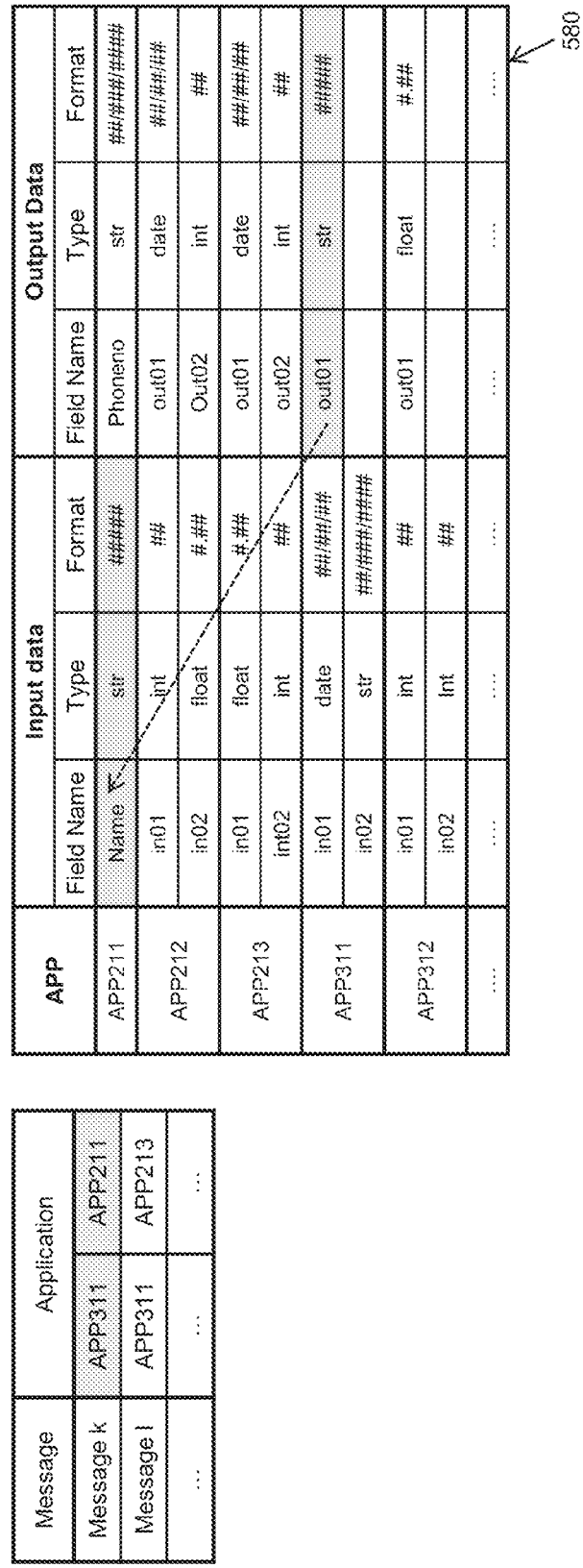
FIG. 18 is a conceptual diagram showing relations between input data and output data of each of applications in an APP execution process in accordance with an embodiment of the present invention.

Hereinafter, an operation of the APP execution control module 404 will be described with reference to FIGS. 17 and 18. The APP execution control module 404 can refer to the APP procedure database 570 illustrated in FIG. 17 in order to control the execution of the application. In other words, the APP execution control module 404 extracts the information on the procedure of applications to be executed from the APP procedure database 570, and generates control signals for executing the corresponding applications. For example, procedures of the contact information management application APP211 are designated as user authentication, input Name, Phone no search, and output Phone_no. When the application APP211 needs to be executed, the APP execution control module 404 generates control signals required for the procedures and provides the control signals to the application APP211. Further, the APP execution control module 404 checks types and formats of input data of each of the applications to be executed. To do so, as described above, it is preferable to construct in advance the APP execution information database 580 in which types and formats of input data of each of the applications are recorded. FIG. 18 shows an embodiment of the APP execution information database 580. If the type and format of the data to be input to the application are the same as those of the corresponding application, the data can be directly input to the application and the application can be executed. If the type and format of the data to be input to the application are different from those of the corresponding application, the type and/or format of the data are converted in accordance with the type and/or format of the corresponding application.

The entities contained in the user message may be provided as the input data to the applications to be executed. Or, the output data of other applications that have been previously executed may be provided as the input data of the corresponding application. In that case, the output data of the previously executed application needs to be converted in accordance with the type and format of the data required by the corresponding application.

In accordance with another embodiment of the present invention, when it is determined that it is not appropriate to execute the application selected by the APP selecting module 402 or that it is more appropriate to modify the selected application, the APP execution control module 404 may correct and execute the application. For example, the number, the type or the format of data required for execution of a specific application may be modified; or the number, the type or the format of data obtained as a result of execution of the corresponding application may be modified; or a part of or all of the procedures contained in the corresponding application may be modified.

The APP procedure database 570 and the APP execution information database 580 may be constructed or renewed in advance and/or in real time by a system designer, a system manager and/or a user. To do so, the reference information management module 590 may generate and provide a required user interface. Further, the reference information management module 590 may regularly or irregularly classify information collected inside or outside the apparatus for controlling execution of a software 100 and record the collected information in the APP procedure database 570 and the APP execution information database 580.

Hereinafter, relations between input data and output data of the applications in an APP execution process in accordance with an embodiment of the present invention will be described with reference to FIG. 18. As described above, the input data of the application to be executed may be an output data of another application that has been executed previously. As shown in the left side of FIG. 18, when application APP311 and APP211 to be executed for the user message k are specified by the APP selecting module 402, the APP execution control module 404 executes APP311 first. To do so, the input data in01 and in02 of specified type and format are input to APP311. Upon completion of the execution of APP311, APP211 is executed. As illustrated, the output data of the application APP311 is provided as the input data of the application APP211. In that case, the APP execution control module 404 converts the type and the format of the output data out01 of APP311 to the type and the format of the input data of APP211. Here, the field name of the input data of APP211 may be different from the field name of the output data of APP311. The output data out01 of APP311 that has been converted in accordance with the type and format of the input data of APP211 is provided as the input data to APP211. The APP execution control module 404 generates control signals for APP311 and APP211 by referring to the APP procedure database 570 and controls the execution of APP311 and APP211.

The correlation between the applications may be constructed and used as database. When the output data of the specific application and the input data of another application are correlated as in the above-described example, the execution of the applications can be easily controlled by recording the information on the database in advance. Further, it is preferable to construct, as database, the information indicating that there exists data shared by two or more applications. For example, in case of a restaurant, selling data of a cash register application is preferably shared by a sales management application. Accordingly, it is not necessary to redundantly store the selling data in the memory, which can save the storage space of the memory.

The configurations of the components 200 to 500 of the apparatus for controlling execution of a software 100 of the present invention and the modules of each of the components are not limited to those described in the above-described embodiment. For example, the modules 202 to 206 of the user message preprocessing unit 200 may be configured as separate units or may be united as a single module. Those who skilled in the art to which the present invention pertains can recognize that other modifications or alternatives exist.

While the present invention has been described with respect to the embodiments of the apparatus for controlling execution of a software and the method for controlling thereof, the technical idea of the present invention may be implemented as a computer-readable recording medium for recording a program for controlling execution of a software.

Figure 19:
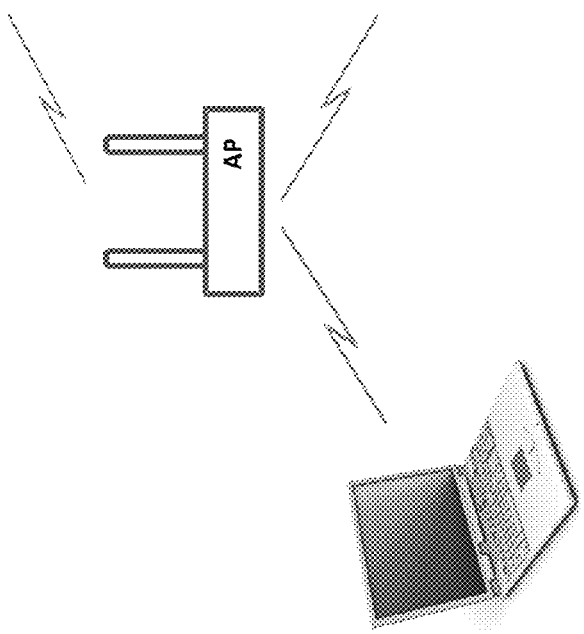
FIG. 19 is a conceptual diagram showing a restaurant reservation and order management system in accordance with an embodiment of the present invention.

The program for controlling execution of a software operates the computer as: a user message preprocessing unit for structuring and analyzing a user message received from a user; a message processing unit for creating an action flow from components extracted from the user message; an APP execution unit for selecting applications for executing actions of the action flow and controlling execution of the selected applications; and a reference information management unit for constructing and managing various databases. The operations of the program for controlling execution of a software of the present invention correspond to the steps of the method for controlling execution of a software, so that detailed description thereof is omitted. Hereinafter, another embodiment of the present invention which is applied to the management of reservation and order in a restaurant will be described. FIG. 19 is a conceptual diagram showing a system for managing reservation and order in a restaurant in accordance with an embodiment of the present invention. An apparatus for controlling execution of a software for a restaurant 3010 includes a user message preprocessing unit, a user message processing unit, an APP execution unit, and a reference information management unit (not shown.) They respectively correspond to the user message preprocessing unit 200, the user message processing unit 300, the APP execution unit 400, and the reference information management unit 500 of the embodiment shown in FIG. 2. Therefore, the detailed description on the configurations thereof will be omitted. The apparatus for controlling execution of a software for a restaurant such as a POS terminal, a personal computer, or a tablet PC receives a user message that requests reservation from a store owner, a customer or the like in the format of a text message or an email. When a customer sends the text message or the email that requests reservation to a store owner, it may be automatically transmitted to the apparatus for controlling execution of a software for a restaurant 3010.

The text message or the email is either a stereotyped message or a non-stereotyped message. When the corresponding user message is received, the apparatus for controlling execution of a software for a restaurant 3010 structures the message in order to determine whether or not the message is a stereotyped message. If the user message is a stereotyped message, the stereotyped message processing module 302 reads out or creates an action flow corresponding to the message by referring to the stereotyped message database 510. If the user message is a non-stereotyped message, the non-stereotyped message processing module 304 selects action requests corresponding to the message by referring to the action request synonym database 520, designates appropriate corresponding jobs to the selected action requests by referring to the corresponding job database 530, and creates an appropriate action flow by referring to the corresponding job-action database 540. Next, the APP selecting module 402 selects appropriate applications for the action flow thus created, and the APP execution control module 404 executes the selected applications by referring to a part of or all of the action-APP database 560, the APP procedure database 570, and the APP execution information database 580.

Specifically, for example, a table is reserved in accordance with information in the user message, such as reservation date, reservation time, the number of persons, or the like. The information on food or drink items frequently ordered by the corresponding customer is read out from the characteristic information database 550 based on the customer identification information including a customer name. The stock of food or drink items is checked based on the read-out information. When the food or drink items are out of stock, the purchase request is submitted. If the customer name is not included in the user message, it is possible to inquire the customer name from the store owner.

Hereinafter, an embodiment in which the reservation request is processed will be described. As illustrated, the system for managing reservation and order in a restaurant 3000 includes: the apparatus for controlling execution of a software for a restaurant 3010 connected thereto wirely or wirelessly; one or more customer tablet PCs 3020; one or more kitchen tablet PCs 3030; and one or more staff tablet PCs (not shown.) When the customer tablet PCs 3020, the kitchen tablet PCs 3030 or the staff tablet PCs (not shown) are provided in plural numbers, each of the PCs is distinguished from others by unique identification information. The apparatus for controlling execution of a software for a restaurant 3010 includes a reservation information management application, a waiting time calculating application or the like. These applications may be recorded in a storage device such as a memory inside the apparatus for controlling execution of a software for a restaurant 3010, a smart card, a CD or the like. The customer tablet PC 3020 provided at each table in the store includes a reservation request application, a reservation information display application or the like. The kitchen tablet PC 3030 provided at the kitchen includes a cooking process management application or the like. It should be understood that such applications may be installed at the apparatus for controlling execution of a software for a restaurant 3010, the customer tablet PC 3020, or the kitchen tablet PC 3030, or may be installed at an external server, or may also be web services.

For example, when a user message including reservation information, table identification information, customer identification information or the like is input from each of the plurality of customer tablet PCs 3020 connected to the apparatus for controlling execution of a software of the present invention 3010, the apparatus for controlling execution of a software 3010 creates an action flow corresponding to the user message through the above-described processes, and executes the selected applications. Each of the customer tablet PCs 3020 includes an input unit to which display and order information can be input, and displays menu items to be served and an order request icon on the display. When a customer selects a desired item among the menu items displayed on the customer table PC 3020 provided at a table and then clicks or touches the order icon, the input unit receives such information. The selection of the menu item or the reservation request may be input by a mouse or a touch panel, or may be input in the format of voice command. Further, the reservation request application acquires identification information of the corresponding customer by receiving the name input by the customer or by other ways. In the case where the corresponding customer had made a reservation in advance, the identification information of the customer may be acquired by referring to the reservation information. The reservation request application transmits the identification information of the customer tablet PC 3020, and the information on the menu item and the customer identification information which have been input by the input unit to the apparatus for controlling execution of a software for a restaurant 3010. The apparatus for controlling execution of a software for a restaurant 301 receives, as a user message, the data such as the unique identification information of the customer tablet PC 3020, the selected menu item, the customer identification information or the like together with the data indicating the order.

The apparatus for controlling execution of a software for a restaurant 301 reads out information such as preferred eating style (e.g., quick serving, course serving, slow serving or the like), desired taste (e.g., salty, average, flat or the like) or the like from the characteristic information database 550 based on the customer identification information. When the customer information has not been stored, a manager or a waiter in charge can input the related information by using a staff tablet PC (not shown) installed at a counter or a separate location after conversation with the customer. The apparatus for controlling execution of a software for a restaurant 3010 determines a cooking procedure of menu items ordered from a plurality of customer tablet PCs 3020 based on the read-out information and transmits the cooking procedure to the kitchen tablet PC 3030. For example, the cooking procedure can be determined such that a food item ordered by a customer who prefers quick serving is cooked first compared to a food item ordered by a customer who prefers slow serving. The kitchen tablet PC 3030 divides the cooking procedure of the ordered menu items into predetermined steps. A cook inputs information indicating the cooking stage in accordance with the actual cooking status, and this information is transmitted to the apparatus for controlling execution of a software for a restaurant 3010. The apparatus for controlling execution of a software for a restaurant 3010 transmits cooking waiting time or cooking completion information to the customer tablet PC 3020 so that the customer can read the corresponding information.

The present invention is not limited to the above-described embodiments and may be variously modified without departing from the scope of the present invention. Further, the functions executed in the above embodiments may be combined as properly as possible. The above embodiments include inventions of different stages and, therefore, various inventions can be extracted by properly combining a plurality of structural requirements disclosed in the above embodiments. For example, even if some elements are removed from all of the elements disclosed in the above embodiments, the resulting configuration can be extracted as an invention, provided that an effect equivalent to that of the present invention can be obtained.

What is claimed is:

1. A software execution control apparatus for controlling execution of a plurality of applications based on a user message received from a user, the apparatus comprising:

a memory and a processor or circuit which is configured to:

access a stereotyped message database in which information on structures of one or more stereotyped messages and an action flow for specifying a first plurality of actions corresponding to said stereotyped messages and execution timing of said first plurality of actions are recorded in correspondence with said one or more stereotyped messages, and an action-APP database in which identification information of a plurality of actions is recorded in correspondence with identification information of a plurality of applications required to perform the plurality of actions;

receive a user message input by or transmitted from the user by a predetermined method;

extract one or more components from said received user message, wherein said one or more components include a command which is text specifying an action to be taken; and determine whether said user message is a stereotyped message by comparing the command extracted from said received user message with a command which is included among one or more components of stereotyped messages recorded in said stereotyped message database;

wherein, in a first case in which said user message is determined to be a stereotyped message, said processor or circuit is configured to:

select, from said stereotyped message database, a stereotyped message having a command which corresponds to the command extracted from said user message, and read out said action flow recorded in correspondence with the stereotyped message selected from said stereotyped message database; and select a first plurality of applications to be executed to perform each of the first plurality of actions specified by said read out action flow by referring to said action-APP database, and execute the selected first plurality of applications;

wherein, in a second case in which said user message is not determined to be a stereotyped message, said processor or circuit is configured to:

access an action request synonym database in which one or more synonyms are recorded in correspondence with a plurality of action requests of a task whose execution is requested by said user message in accordance with the extracted command;

access a corresponding job database in which one or more corresponding jobs to be executed to satisfy each of said plurality of action requests are recorded in correspondence with each of said plurality of action requests;

access a corresponding job-action database in which a second plurality of actions required to perform each of said corresponding jobs are recorded in correspondence with each of said corresponding jobs;

specify said second plurality of actions corresponding to components including the command extracted from said user message by referring to one or more pieces of information from said action request synonym database, said corresponding job database, and said corresponding job-action database, and designate execution timing of said specified second plurality of actions; and select, by referring to said action-APP database, a second plurality of applications to be executed to perform each of said second plurality of actions specified by referring to said one or more pieces of information from said action request synonym database, said corresponding job database, and said corresponding job-action database, and execute the selected second plurality of applications; and wherein, in the first case, said processor or circuit is configured to generate a control signal for controlling execution of the selected first plurality of applications based on information on a procedure of the selected first plurality of applications to be executed, and in the second case, said processor or circuit is configured to generate a control signal for controlling execution of the selected second plurality of applications based on information on a procedure of the selected second plurality of applications to be executed.

2. The software execution control apparatus of claim 1, wherein said processor or circuit is further configured to change a type or format of data to be input to said first plurality of applications or said second plurality of applications based on information on a type and format of input data of said first plurality of applications or said second plurality of applications to be executed.

3. The software execution control apparatus of claim 1, wherein said processor or circuit is further configured to provide output data of a plurality of finally executed applications to said user or a recipient determined based on said user message.

4. The software execution control apparatus of claim 1, wherein said processor or circuit is further configured to:

access a characteristic information database in which one or more characteristics of each of users are recorded in correspondence with information selected from a group including weight and priority of a plurality of choices of each of said characteristics, and select the second plurality of actions corresponding to components including the command extracted from said user message by referring to said characteristic information database.

5. The software execution control apparatus of claim 1, wherein said processor or circuit is further configured to:

access a characteristic information database in which one or more characteristics of each of a plurality of users are recorded in correspondence with information selected from a group including weight and priority of a plurality of choices of each of said characteristics, and select the second plurality of applications by referring to said characteristic information database.

6. The software execution control apparatus of claim 1, wherein said processor or circuit is further configured to generate combinations of said second plurality of actions corresponding to said action requests and select one or more combinations among said combinations in a case in which there exists a plurality of actions corresponding to one of said action requests.

7. The software execution control apparatus of claim 6, wherein said processor or circuit is further configured to:

access a characteristic information database in which characteristic of each user are recorded in correspondence with weight information of a plurality of choices of each of said characteristics, and select said one or more combinations based on values selected from operation results selected from a group including sum and product of weights of actions of each of said combinations by referring to said characteristic information database.

8. The software execution control apparatus of claim 1, wherein the one or more components of the user message include an entity and the command which is the text specifying the action to be taken with respect to the entity.

9. A software execution control method for a software execution control apparatus for controlling execution of a plurality of applications based on a user message received from a user, wherein the software execution control apparatus comprises a memory and a processor or circuit for performing the method comprising:

accessing, by the processor or circuit, a stereotyped message database in which information on structures of one or more stereotyped messages and an action flow for specifying a first plurality of actions corresponding to said stereotyped messages and execution timing of said first plurality of actions are recorded in correspondence with said one or more stereotyped messages, and an action-APP database in which identification information of a plurality of actions is recorded in correspondence with identification information of a plurality of applications required to perform the plurality of actions;

receiving, by the processor or circuit, a user message input by or transmitted from the user by a predetermined method;

extracting, by the processor or circuit, one or more components from said received user message, wherein said one or more components include a command which is text specifying an action to be taken; and determining, by the processor or circuit, whether said user message is a stereotyped message by comparing said command extracted from said received user message with a command which is included among one or more components of stereotyped messages recorded in said stereotyped message database;

wherein, in a first case in which said user message is determined to be a stereotyped message, said method further comprises:

selecting, by the processor or circuit, a stereotyped message from said stereotyped message database having a command which corresponds to the command extracted from said user message, and reading out, by the processor or circuit, said action flow recorded in correspondence with the stereotyped message selected from said stereotyped message database; and selecting, by the processor or circuit, a first plurality of applications to be executed to perform each of the first plurality of actions specified by said read out action flow by referring to said action-APP database, and executing, by the processor or circuit, the selected first plurality of applications;

wherein, in a second case in which said user message is not determined to be a stereotyped message, said method further comprises:

accessing, by the processor or circuit, an action request synonym database in which one or more synonyms are recorded in correspondence with a plurality of action requests of a task whose execution is requested by said user message in accordance with the extracted command;

accessing, by the processor or circuit, a corresponding job database in which one or more corresponding jobs to be executed to satisfy each of said plurality of action requests are recorded in correspondence with each of said plurality of action requests;

accessing, by the processor or circuit, a corresponding job-action database in which a second plurality of actions required to perform each of said corresponding jobs are recorded in correspondence with each of said corresponding jobs;

specifying, by the processor or circuit, said second plurality of actions corresponding to components including the command extracted from said user message by referring to one or more pieces of information from said action request synonym database, said corresponding job database, and said corresponding job-action database, and designating, by the processor or circuit, execution timing of said specified second plurality of actions; and selecting, by the processor or circuit, a second plurality of applications to be executed by referring to said action-APP database to perform each of said second plurality of actions specified by referring to said one or more pieces of information from said action request synonym database, said corresponding job database, and said corresponding job-action database, and executing, by the processor or circuit, said selected second plurality of applications; and wherein, in the first case, said method further comprises generating, by the processor or circuit, a control signal for controlling execution of the selected first plurality of applications based on information on a procedure of the selected first plurality of applications to be executed, and in the second case, said method further comprises generating, by the processor or circuit, a control signal for controlling execution of the selected second plurality of applications based on information on a procedure of the selected second plurality of applications to be executed.

10. A non-transitory computer-readable storage medium having stored thereon a program that is executable by a computer of a software execution control apparatus for controlling execution of a plurality of applications based on a user message received from a user, the program being executable by the computer to cause the computer to perform functions comprising:

accessing a stereotyped message database in which information on structures of one or more stereotyped messages and an action flow for specifying a first plurality of actions corresponding to said stereotyped messages and execution timing of said first plurality of actions are recorded in correspondence with said one or more stereotyped messages, and an action-APP database in which identification information of a plurality of actions is recorded in correspondence with identification information of a plurality of applications required to perform the plurality of actions;

receiving a user message input by or transmitted from the user by a predetermined method;

extracting one or more components from said received user message, wherein said one or more components include a command which is text specifying an action to be taken; and determining whether or not said user message is a stereotyped message by comparing said command extracted from said received user message with a command which is included among one or more components of stereotyped messages recorded in said stereotyped message database;

wherein, in a first case in which said user message is determined to be a stereotyped message, said program causes said computer to perform further functions comprising:

selecting, from said stereotyped message database, a stereotyped message having a command which corresponds to the command extracted from said user message, and reading out said action flow recorded in correspondence with the stereotyped message selected from said stereotyped message database; and selecting a first plurality of applications to be executed to perform each of the first plurality of actions specified by said read out action flow by referring to said action-APP database, and executing the selected first plurality of applications, wherein, in a second case in which said user message is not determined to be a stereotyped message, said program causes said computer to perform further functions comprising:

accessing an action request synonym database in which one or more synonyms are recorded in correspondence with a plurality of action requests of a task whose execution is requested by said user message in accordance with the extracted command;

accessing a corresponding job database in which one or more corresponding jobs to be executed to satisfy each of said plurality of action requests are recorded in correspondence with each of said plurality of action requests;

accessing a corresponding job-action database in which a second plurality of actions required to perform each of said corresponding jobs are recorded in correspondence with each of said corresponding jobs;

specifying said second plurality of actions corresponding to components including the command extracted from said user message by referring to one or more pieces of information from said action request synonym database, said corresponding job database, and said corresponding job-action database, and designating execution timing of said specified second plurality of actions; and selecting, by referring to said action-APP database, a second plurality of applications to be executed to perform each of said second plurality of actions specified by referring to said one or more pieces of information from said action request synonym database, said corresponding job database, and said corresponding job-action database, and executing said selected second plurality of applications; and wherein, in the first case, said program causes said computer to perform further functions comprising generating a control signal for controlling execution of the selected first plurality of applications based on information on a procedure of the selected first plurality of applications to be executed, and in the second case, said program causes said computer to perform further functions comprising generating a control signal for controlling execution of the selected second plurality of applications based on information on a procedure of the selected second plurality of applications to be executed.

11. The non-transitory computer-readable storage medium of claim 10, wherein said program further causes said computer to perform a function comprising:

changing a type or format of data to be input to said first plurality of applications or said second plurality of applications based on information on a type and format of input data of said first plurality of applications or said second plurality of applications to be executed.

12. The non-transitory computer-readable storage medium of claim 10, wherein said program further causes said computer to perform a function comprising:

providing output data of a plurality of finally executed applications to said user or a recipient determined based on said user message.

13. The non-transitory computer-readable storage medium of claim 10, wherein said program causes the computer to access:

a characteristic information database in which one or more characteristics of each of users are recorded in correspondence with information selected from a group including weight and priority of a plurality of choices of each of said characteristics, and said specifying said second plurality of actions comprises selecting the second plurality of actions corresponding to components including the command extracted from said user message by referring to said characteristic information database.

14. The non-transitory computer-readable storage medium of claim 10, wherein said program causes the computer to access:

a characteristic information database in which one or more characteristics of each of a plurality of users are recorded in correspondence with information selected from a group including weight and priority of a plurality of choices of each of said characteristics, and said selecting the second plurality of applications comprises selecting the second plurality of applications by referring to said characteristic information database.

15. The non-transitory computer-readable storage medium of claim 10, wherein said program further causes said computer to perform a function comprising:

generating combinations of said second plurality of actions corresponding to said action requests and selecting one or more combinations among said combinations in a case in which there exists a plurality of actions corresponding to one of said action requests.

16. The non-transitory computer-readable storage medium of claim 15, wherein said program causes the computer to access:

a characteristic information database in which characteristic of each user are recorded in correspondence with weight information of a plurality of choices of each of said characteristics, and wherein said selecting one or more combinations comprises performing said selection based on values selected from operation results selected from a group including sum and product of weights of actions of each of said combinations by referring to said characteristic information database.

* * * * *